(No Model.)
E. L'E. BARTON.
VELOCIPEDE.
No. 589,328. Patented Aug. 31, 1897.
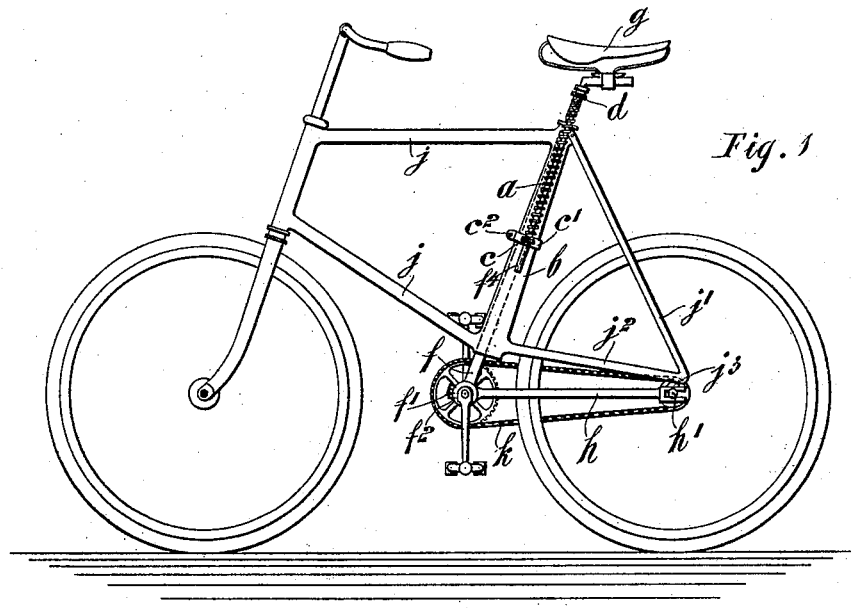
Fig. 1
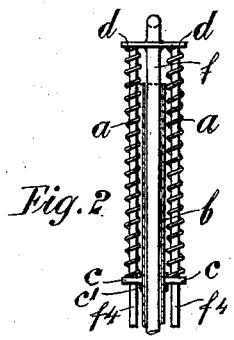
Fig. 2
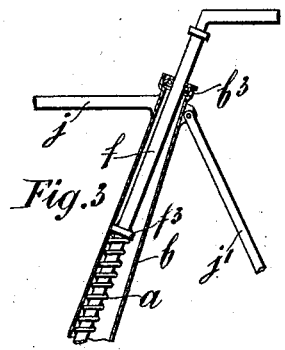
Fig. 3
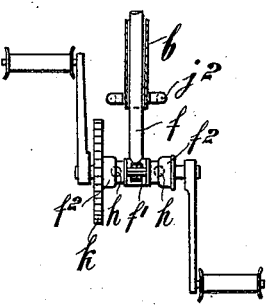
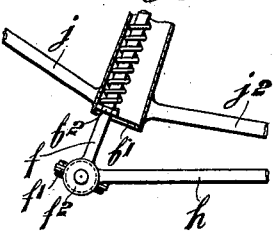
Witnesses
H. van Oldenneel
E. A. Scott
Inventor
Elliott L'Estrange Barton
by Richardson
Attorneys

UNITED STATES PATENT OFFICE.

ELLIOTT L'ESTRANGE BARTON, OF WELLINGTON, NEW ZEALAND.

VELOCIPEDE.

SPECIFICATION forming part of Letters Patent No. 589,328, dated August 31, 1897.

Application filed October 12, 1896. Serial No. 608,582. (No model.)

*To all whom it may concern:*

Be it known that I, ELLIOTT L'ESTRANGE BARTON, a subject of the Queen of Great Britain, residing at 54 Lambton Quay, in the city of Wellington, in the Colony of New Zealand, have invented certain new and useful Improvements in Velocipedes, of which the following is a specification.

The object of my invention is to provide an improved form of velocipede in which the seat and the pedals may have the same vertical movement or oscillations when the machine is traveling and more especially when the said machine meets with any obstruction, such as in rolling over stones or inequalities in the road.

The invention consists in the construction hereinafter described, and pointed out in the claims.

Now by my invention I make the nearly vertical pillar (which forms part of the framing which carries the pedal-shaft bearings) in the form of a hollow tube, and through this tube I pass an upright rod to the bottom end of which are attached the bearings to receive the pedal-axle, and to the top end I fix rigidly the seat for the rider. I therefore have an upright rod free to move vertically up or down and carrying both pedals and seat. Underneath the seat and between the seat and framing or in any convenient position I place a spring-cushion or steel spring of any convenient form, so that the said spring is compressed, released, or vibrated by any vertical shock to which the machine and driver may be subjected, and such vibration acts as a relief equally to the seat and the feet of the rider and also relieves the frame of part of the shock to which it has been subjected under the old system of manufacture.

My invention admits of variations such as in the form of spring or cushion and the position in which these are placed. Indeed my principle may be worked out in many ways, according to the judgment of the maker.

In order that my invention may be most easily understood by one skilled in the art to which it appertains, I have illustrated the same upon the accompanying drawings, to which I shall now refer and give a detailed description.

Figure 1 is a side view of a bicycle fitted with one form of my invention. Fig. 2 is a front view of the hollow pillar in section with the springs in position on the outside of the same. Fig. 3 is a side view of the hollow pillar in section with the spring arranged in the interior of the same.

Similar letters of reference indicate similar parts.

In carrying out my invention I place springs $a$ and their guide-rods $f^4$ on the outside of pillar $b$ and rest their lower ends upon brackets $c$, fixed to the pillar by their clamp $c'$ and bolt $c^2$. The upper ends of these springs take beneath brackets $d$, formed upon or attached to the upright rod $f$, which is shaped at its upper end in the usual manner, as shown in Fig. 1, to receive the seat $g$. The lower end of rod $f$ is formed into a bearing $f'$ and incloses the center portion of the pedal-bearing bracket $f^2$. (See Figs. 2 and 3.) Radial links $h$ are rigidly attached to bearing-bracket $f^2$ and are secured to the rear axle $h'$ in the usual manner.

The rear forks $j'$ and $j^2$ of the frame $j$ meet at their lower extremities and are furnished with any ordinary bearing $j^3$ which will allow the axle $h'$ to revolve when required by the movement of the radial links $h$.

In operation the rod $f$ rises and falls under the weight of the rider when passing over inequalities of the ground, sufficient play being allowed to permit of the swinging movement of the rod, and as the seat is attached to the upper and the pedal-bearing bracket to the lower end of such rod the distance apart of the seat and pedals will remain constant and they will rise and fall together. The radial links $h$ move with rod $f$ and maintain the distance apart of the bearing-bracket $f^2$ and rear axle $h'$ constant; and, further, they take the strain of the driving-chain $k$ and relieve the lower fork $j^2$ of such strain. The pillar $b$ is preferably made oval, or nearly so, in section to provide room for the fore-and-aft movement of the rod $f$.

In Fig. 3 I have shown the carrying-spring $a$ in the interior of pillar $b$ and a collar $f^3$ upon rod $f$ to bear upon the upper end of the spring and provide a shoulder or ledge $b'$ upon the inside of the lower end of pillar $b$, upon which shoulder may rest a washer $b^2$. Rod $f$ passes freely through the spring and washer, and the lower end of spring $a$ rests safely upon the same. The rod $f$ has thus a free vertical movement under the action of spring $a$, and at the same time may have a fore-and-aft movement within the oval pillar $b$ by washer $b^2$ sliding upon shoulder $b'$.

At the upper end of pillar $b$ I arrange a ball-bearing head $b^3$ to reduce friction and give a freely-sliding motion to rod $f$.

I wish it to be understood that I do not confine myself to the exact details hereinbefore described, as these may be modified in various ways by a skilled person without departing from the spirit of my invention—as, for example, I may dispense with washer $b^2$ and its sliding movement by making a spring in shape corresponding to the interior of pillar $b$, which form would permit the rod $f$ to oscillate within the spring, and again I may substitute suitable rollers for the balls in head $b^3$.

From the above description it will be seen that I am able to retain the form of the ordinary diamond frame, with all its advantages of rigidity and strength, and provide mechanism whereby the comfort and safety of the rider is considerably increased, and that my invention may be used upon the ordinary bicycle constructed for ladies.

What I claim as my invention, and desire to secure by Letters Patent, is—

1. In a velocipede having an oval pillar, a spring-supported rod passing through the pillar and carrying a seat at its upper end and pedal-bearings at its lower end and links connecting the pedal-bearing to the axle.

2. In a velocipede having an oval pillar, a rod passing through the pillar, a saddle supported from the upper end of said rod, a pedal-bearing at the lower end thereof, links from said pedal-bearing to the axle, and springs upon each side of the pillar supporting the rod, substantially as described.

ELLIOTT L'ESTRANGE BARTON.

Witnesses:
  W. E. HUGHES,
  W. ALEXANDER.